United States Patent
Saarinen et al.

(10) Patent No.: US 6,697,759 B2
(45) Date of Patent: Feb. 24, 2004

(54) METHOD OF DETERMINING SPEED OF ROTATION OF A MOTOR AND A COMPUTER SOFTWARE PRODUCT TO CARRY OUT THE METHOD

(75) Inventors: Kari Saarinen, Kaarnatie (FI); Michal Orkisz, Ul. Zakatek (PL)

(73) Assignee: ABB Research Ltd., Zurich (CH)

( * ) Notice: Subject to any disclaimer, the term of this patent is extended or adjusted under 35 U.S.C. 154(b) by 3 days.

(21) Appl. No.: 10/233,627

(22) Filed: Sep. 4, 2002

(65) Prior Publication Data

US 2003/0036878 A1 Feb. 20, 2003

Related U.S. Application Data

(63) Continuation of application No. PCT/FI01/00271, filed on Mar. 19, 2001.

(30) Foreign Application Priority Data

Mar. 20, 2000 (FI) .................................................. 000646

(51) Int. Cl.⁷ ............................ G01P 3/00; G06F 15/00
(52) U.S. Cl. ........................................ 702/145; 702/147
(58) Field of Search ............................... 702/142, 145, 702/147, 148, 182, 186, 190, 75, 79; 340/680, 683; 324/177, 160

(56) References Cited

U.S. PATENT DOCUMENTS 5,365,787 A * 11/1994 Hernandez et al. ........... 73/660
5,424,636 A    6/1995 Rollwage et al.
6,085,121 A * 7/2000 Stern ........................... 700/175

FOREIGN PATENT DOCUMENTS

| DE | 196 00 640 A1 | 7/1997 |
| EP | 0 632 261 A2 | 1/1995 |
| WO | 99/10715 | 3/1999 |

OTHER PUBLICATIONS

English Language Abstract for 196 00 640 A1 (DE).

* cited by examiner

*Primary Examiner*—Bryan Bui
(74) *Attorney, Agent, or Firm*—Dykema Gossett PLLC

(57) ABSTRACT

The present invention relates to a method of determining speed of rotation of a motor. The method involves collecting samples with a measuring sensor at a sampling frequency, set on the basis of mechanical vibration of the motor, for the duration of a measurement period and storing the samples in the memory of a data carrier as measurement data of a fixed format. The speed of rotation of the motor is determined from the measurement data by determining the cycle length of a periodic vibration signal in the time domain by means of a maximum likelihood estimate calculated by maximizing a maximum likelihood function adjusted to the measurement data, the speed of rotation being obtained from the frequency point where the maximum likelihood function obtains its maximum value.

8 Claims, 2 Drawing Sheets

METHOD OF DETERMINING SPEED OF ROTATION OF A MOTOR AND A COMPUTER SOFTWARE PRODUCT TO CARRY OUT THE METHOD

RELATED APPLICATION

This application is a continuation of PCT/FI01/00271 field Mar. 19, 2001 designating the United States.

FIELD OF THE INVENTION

The invention relates to a method of determining the speed of rotation of a motor and to a computer software product according to the method. The device the speed of rotation of which is to be determined is one that comprises a rotating shaft, such as an electric motor, or a similar device comprising a rotating shaft.

BACKGROUND OF THE INVENTION

The invention relates to monitoring the condition of a motor. Motor condition monitoring based on the vibration produced by the motor and a condition analysis made on the basis of the vibration is widely known in the art. There are several motor faults, such as unbalance, looseness, resonance, bearing failures, and the like, which cause abnormal vibration of the motor.

A commonly applied condition indicator is the root mean square (rms) value of a vibrational velocity signal in the region of 10–1000 Hz. The allowed limits are given in ISO standards, such as ISO-10816. The root mean square value allows motor faults to be detected, but it cannot be used for identifying the type of fault concerned. An experienced serviceman, however, is often able to analyse the spectrum of the vibration signal and thereby evaluate also the type of fault.

It is known art to carry out measurements relating to condition monitoring of motors in the following way, for example. When a fault is suspected in a motor, or in connection with a routine maintenance of the motor, the vibration of the motor is measured using a suitable vibration measuring sensor. The measurement is carried out by coupling a speed sensor or an acceleration sensor connected to a data collection means, such as a PC, to the motor, the measurement being then carried out by taking samples of the motor vibration in axial, horizontal and vertical directions at the driven end of the motor shaft and also in one direction at the opposite shaft end. The measurement data obtained from the measuring sensor is stored in the memory of the data collection means and processed by applying software which uses the vibration data to produce a vibration spectrum which is then analysed visually.

Depending on the speed of rotation of the motor's rotor, the direction and magnitude of the forces causing vibration in the motor vary. For this reason mechanical motor faults often cause motor vibration which has a cycle length which is inversely proportional to the speed of rotation of the motor's rotor. The faults thus cause periodic vibrations in the motor, the frequencies of which can be found out by spreading the vibration signal measured from the motor into frequency components. The form of the vibration signal and the periodic frequencies it comprises depend on the motor type, the speed of rotation and the type of malfunction.

For the above reasons, accurate determining of speed is of primary importance in fault analysis. In prior art measurement solutions, rotation speed of motors is measured using tachometer or stroboscope measurements.

There are, however, major drawbacks in the prior art. When a tachometer is used for measuring speed of rotation, there must be one mounted in the motor, or one must be mounted for the measurement. Correspondingly, when a stroboscope is used, the motor must contain the means for carrying out the measurement. Motors do not usually have built-in speed measurement devices, but the motor must be halted for mounting one. However, motors used in industrial processes cannot usually be halted without causing undue harm for the process in which the motor is one component.

A fault analysis method in which measurement data obtained from a measuring sensor is stored in the memory of a data collection means and processed using software which produces from the vibration data a vibration spectrum for visual analysis requires a discrete Fourier transform (DFT) of the signal. In DFT the measurement time and the frequency resolution (the distinction between two consecutive frequency points) are interrelated in that the better the desired resolution, the longer is the measurement time required. A long measurement time is a problem, because the motor load, and thereby its speed of rotation, should remain constant during the measurement to allow accurate and reliable measurement data to be collected. When the motor is used in an industrial process, this is not, however, usually possible without causing undue harm for the process. Secondly, a set of frequency points where the calculation is to be carried out is determined in advance in the DFT method on the basis of the measurement time and sampling frequency. If the speed of rotation is not exactly the same as the frequency at any of the predetermined frequency points, error will occur in the estimation of fault frequencies which are proportional to the speed of rotation, and, consequently, amplitude estimates will also be erroneous.

As illustrated above, drawbacks that often appear in connection with the prior art include the need to halt the motor for the mounting of the speed measurement device, the need for a plural number of measurement devices and, thereby, the need to carry out various measurements to allow an analysis to be made. Moreover, an accurate analysis requires a long measurement time, during which a constant speed of rotation of the motor is required. This naturally slows down and complicates the measurement, and impairs its accuracy and reliability.

BRIEF DESCRIPTION OF THE INVENTION

It is an object of the invention to alleviate the drawbacks of the prior art, and to provide an improved method of determining speed of rotation and computer software implementing the method.

This is achieved by a method and computer software of the present invention which comprise the characteristics set forth in the claims. More precisely, a method according to a preferred embodiment of the invention is primarily characterized by what is stated in the characterizing part of claim 1.

An underlying idea of the invention is that speed of rotation of a motor is determined by measuring the mechanical vibration of the motor with a suitable measuring sensor. Measurement data is collected from the vibration at a suitable frequency for a predetermined measurement period. The measurement data is stored in the memory of a data carrier as measurement data of a fixed format. The speed of rotation of the motor is then determined from the measurement data by determining the cycle length of a periodic vibration signal in the time domain, and not in the frequency domain, by using a maximum likelihood estimate (MLE)

calculated by maximizing a maximum likelihood function (MLF) of the measurement data. The speed of rotation is thus at the frequency point where the maximum likelihood function (MLF) obtains its highest value.

Before the ML function is calculated, the vibration signal is filtered using a bandpass filter on the passband of which the rotation frequency estimated in advance is located. An advantage of this is that interference in the measurement data, if any, can be attenuated.

The speed of rotation is determined using the maximum likelihood estimate of the time domain. This provides an advantage in that the measurement time needed for determining the frequency is now significantly shorter than in the conventional DFT method. The reason for this is that in the maximum likelihood method, frequency is produced as a continuous variable and not as separate values in which the minimum difference between two frequency values, i.e. their resolution, would be determined by the measurement time and the sampling frequency, as in the commonly used DFT method of the frequency domain. In the maximum likelihood method the only factor having an effect on the accuracy at which the speed of rotation can be determined is the magnitude of interference in the measurement signal.

Practice has shown that for the impact of the interference that is in the measurement signals to be eliminated, the length of the measurement period must be more than 50 times the cycle length of the vibration signal. As a result, the required measurement time is shorter at higher rotation speeds than at lower rotation speeds. A measurement time which is about 50 times the cycle length of the vibration signal is, however, advantageously short in proportion to the variation in the speed of rotation caused by variations in the motor load. For example, motors having a speed of rotation of 25 Hz require a measurement time of 2 seconds in the maximum likelihood method, whereas in DFT methods a measurement time of about 30 seconds is needed to obtain the required resolution.

For sufficiently reliable measurement results to be obtained, a sampling frequency about three times the synchronous speed of the motor is preferred.

BRIEF DESCRIPTION OF THE DRAWINGS

In the following the invention will be described with reference to the accompanying drawings, in which.

DETAILED DESCRIPTION OF THE INVENTION

Figure 1:
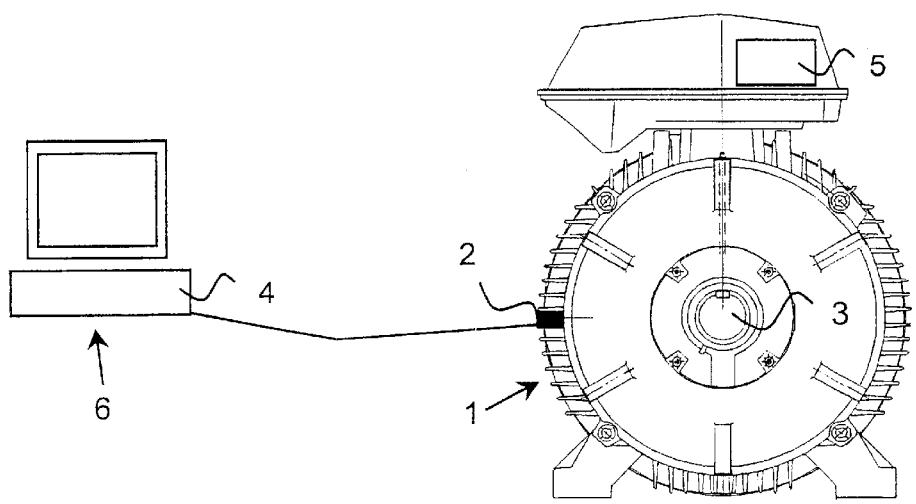
FIG. 1 is a schematic view of a measurement arrangement of the invention for determining a speed of rotation of a motor.

FIG. 1 shows an arrangement of a preferred embodiment of the invention for measuring speed of rotation. The embodiment illustrates, by way of example, the determining of the speed of rotation of an electric motor by means of a method of the invention.

The speed of rotation is measured from an electric motor 1 comprising a shaft 3. The shaft 3 of the electric motor 1 transmits rotational motion to a process to which the motor 1 is connected. The rotation of the shaft 3 of the electric motor 1 causes mechanical vibration in the motor 1, the vibration being measured by a measuring sensor 2 connected to the electric motor 1.

The measuring sensor 2 is an acceleration sensor or a speed sensor the implementation of which is based on capacitive or piezoelectric operation. To the measuring sensor 2 is connected a data collection means 4, such as a PC 4, or a similar device provided with a memory means suitable for data collection.

Figure 3:
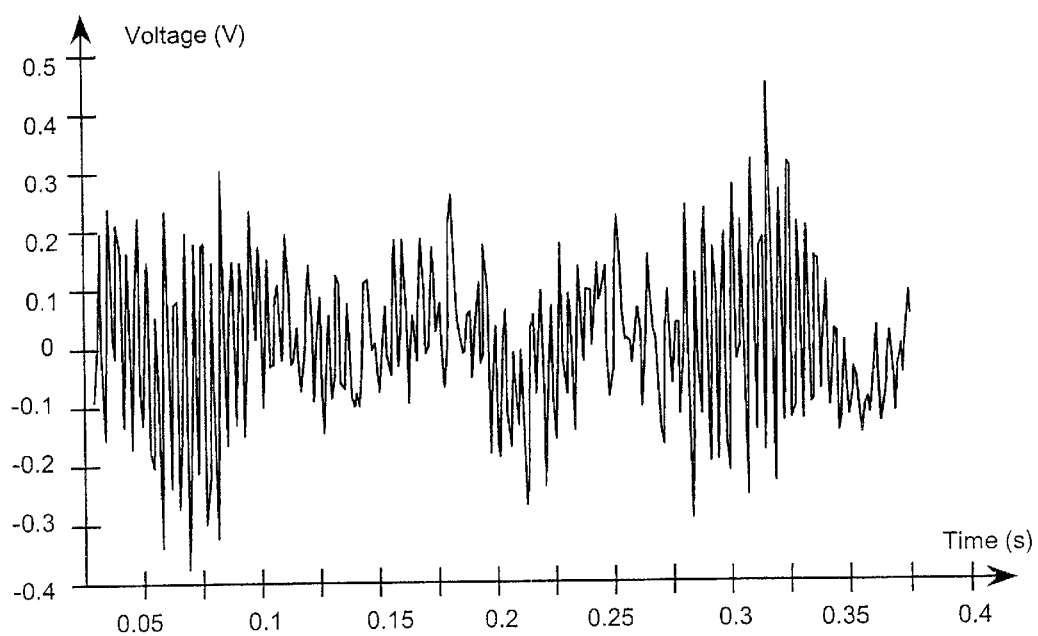
FIG. 3 illustrates mechanical vibration measured from an unbalanced motor with an acceleration sensor and shown in the form of a voltage signal represented as a function of time.

For collecting data on the mechanical vibration of the electric motor 1 for the rotation speed measurement, the measuring sensor 2 coupled to the data collection means 4, such as the PC 4, is connected to the electric motor 1. The measurement is taken in axial, horizontal and vertical directions at the driven end of the shaft 3 of the motor 1 and also in one direction at the opposite end of the shaft 3. FIG. 3 illustrates mechanical vibration measured from an unbalanced motor with an acceleration sensor and shown in the form of a voltage signal represented as a function of time.

The data collection means 4 comprises computer software which is used for collecting the vibration data and for storing it in the memory of the data collection means 4 to provide processable measurement data of a fixed format. Before the measurement is initiated, the software is provided with the initial data, to be described below, needed for carrying out the measurement.

On the basis of the characteristics 5 of the electric motor 1, a synchronous speed $f_n$ can be determined for the electric motor 1. The described preferred embodiment assumes that the electric motor 1 rotates at a synchronous speed $f_n$ of 1500 rotations per minute, i.e. 25 rotations per second, or at a frequency of 25 Hz.

Next, the length of the measurement period T used in the data collection is set. The preferred length of the measurement period T is 50 times the synchronous speed $f_n$ of the electric motor 1. When the synchronous speed $f_n$ of the electric motor 1 is 25 Hz, a measurement period T of 2 seconds is needed.

The next step is to set a sampling frequency $f_s$ to be applied in the data collection. To provide a reliable measurement result, the sampling frequency $f_s$ must be at least three times the synchronous speed $f_n$ of the electric motor 1. When the synchronous speed of the motor 1 is 25 Hz, a sampling frequency $f_s$ of at least 75 Hz is required.

The measurement is then initiated by collecting samples x[n] at the sampling frequency $f_s$, set on the basis of the mechanical vibration of the electric motor 1, for the duration of the measurement period T. The data collection means 4 comprises computer software 6 for collecting the vibration data and for storing it in the memory of the data collection means 4 as processable measurement data of a fixed format.

After the measurement data have been collected and stored in the memory of the data collection means, the measurement data are processed using the computer software 6 determining the speed of rotation of the electric motor 1.

The speed of rotation of the electric motor 1 is determined from the measurement data by determining the cycle length of the periodic vibration signal in the time domain by means of a maximum likelihood estimate (MLE) calculated by maximizing a maximum likelihood function J. The speed of rotation is at a frequency point where the maximum likelihood function J obtains its highest value.

The maximum likelihood function to be used for determining the speed of rotation of the electric motor 1 takes the following form:

$$J = \text{ABS}\left(\sum_{n=0}^{N-1} x(n)e^{-j2\pi\upsilon n}\right),$$

in which formula
ABS=the absolute value of a complex number
J=a maximum likelihood function (MLF) to be maximized
N=the number of samples
n=the order number of a sample
x(n)=an individual sample
$\upsilon$=a digital frequency of a periodic vibration signal, and $\upsilon = f/f_s,$ in which formula
f=the frequency of the periodic vibration signal
$f_s$=sampling frequency.

In the following, the operation of the method will be described with reference to FIG. 2 which illustrates a principle for determining the rotation speed of the motor 1 from the maximum likelihood function J adjusted to the measurement data.

In the first step, a rotation speed search interval 21 is determined, i.e. an initial frequency point $f_{ini}$ 20 and an end point $f_{end}$ 21 of frequency. The point of origin of the search interval 20, 21 is obtained on the basis of the synchronous speed $f_n$ of the electric motor 1. If the synchronous speed $f_n$ of the electric motor 1 is 1500 rotations per minute, i.e. 25 Hz, then the initial point 20 of the search interval 20, 21 is selected such that $f_{ini}$=23 Hz and the end point 21 such that $f_{end}$=25 Hz, because the slip of the motor 1 causes the speed of rotation to be lower than the synchronous speed $f_n$.

In the second step, the vibration signal in the measurement data is filtered with a bandpass filter, such as a FIR (Finite Impulse Response) filter of the 50$^{th}$ order, the coefficients of which have been calculated using an optimal Parks-McClellan algorithm (Alan V. Oppenheim, Ronald W. Scafer: "Discrete-Time Signal Processing" Prentige Hall Inc., New Jersey 1989, pp. 476–479). The search interval 20, 21 is located on the passband of the bandpass filter.

In the third step, the search interval 20, 21 is divided into sub-intervals 10, 11, 12, 13, 14 of an equal length such that $f_k = f_{ini} + k(f_{end} - f_{ini})/N$, where $k=0,1,\ldots,N$.

Figure 2:
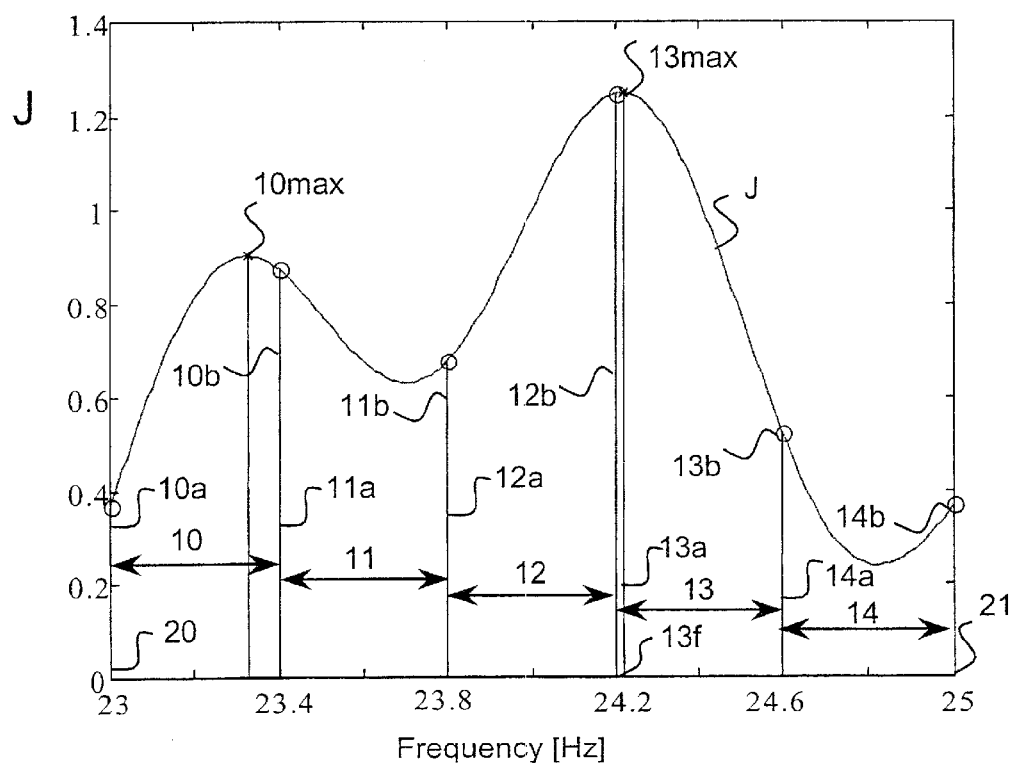
FIG. 2 illustrates a principle of determining the speed of rotation of a motor by using a maximum likelihood function adjusted to measurement data.

As shown in the example of FIG. 2, the number of sub-intervals is selected such that N=5, whereby the end points of the sub-intervals are denoted in sub-interval 10 by points 10a=23 Hz and 10b=23.4 Hz, in sub-interval 11 by points 11a=23.4 Hz and 11b=23.8 Hz, in sub-interval 12 by points 12a=23.8 Hz and 12b=24.2 Hz, in sub-interval 13 by points 13a=24.2 Hz and 13b=24.6 Hz, and in sub-interval 14 by points 14a=24.6 Hz and 14b=25 Hz.

In the fourth step, the highest value of the maximum likelihood function J is determined in each sub-interval:

$J_k^{max} = \max(J(f_k^{max}))$, where $k=1,2,\ldots,N$ $f_k^{max} \in [f_{k-1}, f_k]$ As shown in FIG. 2, in the second 11, third 12 and fifth 14 sub-intervals the maximum likelihood function J obtains its highest value at end point 11a, where $f_2^{max}$=23.4 Hz, end point 12b, where $f_3^{max}$=24.2 Hz, and end point 14a, where $f_5^{max}$=24.6 Hz. In the first 10 and fourth 13 sub-intervals the maximum likelihood function J has a local maximum value $J_k^{max}$. In FIG. 2 the local maximum values are at points 10max, where $f_1^{max}$=23.33 Hz and 13max, where $f_4^{max}$=24.22 Hz. The highest value of the maximum likelihood function J is searched for using for example the Brent method (William H. Press, Brian P. Flannery, Saul A. Teukolsky, William T. Wetterling: "Numerical Recipies", Cambridge University Press 1986, pp. 283–286).

In the fifth step, the speed of rotation of the electric motor 1 is selected to be an $f_k^{max}$ value 13f corresponding to the highest value 13max of maximum likelihood function $J_k^{max}$. In the example of FIG. 2 the speed of rotation thus arrived at is value $f_4^{max}$=24.22 Hz 13f which corresponds to the highest maximum likelihood function value $J_4^{max}$ 13max of the calculated $f_k^{max}$ values 13f. Consequently, the actual speed of rotation of the electric motor 1, determined with the method of the invention, is at point 13f $f_4^{max}$=24.22 Hz, i.e.1453.2 rotations per minute.

It is to be understood that the above specification and the accompanying Figures are only intended to illustrate the present invention. The invention is thus not restricted to the embodiment described above or disclosed in the claims, but a person skilled in the art will find it apparent that diverse variations and modifications can be made to the invention within the inventive idea disclosed in the accompanying claims.

What is claimed is:

1. A method of determining speed of rotation of a motor (1), the method comprising
   connecting a measuring sensor (2) to the motor (1);
   determining the synchronous speed of the motor (1);
   setting the length of a measurement period (T);
   setting a sampling frequency ($f_s$);
   collecting samples (x[n]) with a measuring sensor (3) at the sampling frequency ($f_s$), set on the basis of mechanical vibration of the motor (1), for the duration of the measurement period (T);
   storing the samples (x[n]) in the memory of a data carrier (4) as measurement data of a fixed format,
   determining the speed of rotation of the motor (1) from the measurement data by determining the cycle length of a periodic vibration signal in the time domain by applying a maximum likelihood estimate calculated by maximizing a maximum likelihood function (J) adjusted to the measurement data, the speed of rotation being obtained from a frequency point (13f) where the maximum likelihood function (J) obtains its maximum value (13max).

2. A method according to claim 1, wherein, before the speed of rotation is determined, the vibration signal is filtered in a bandpass filter to attenuate the interference that is in the signal.

3. A method according to claim 1, wherein the maximum likelihood function (J) takes the following form $$J = \text{ABS}\left(\sum_{n=0}^{N-1} x[n]e^{-j2\pi\upsilon n}\right),$$

in which formula
ABS=the absolute value of a complex number
J=a maximum likelihood function to be maximized
N=the number of samples
n=the order number of a sample
x[n]=an individual sample
$\upsilon$=the digital frequency of a periodic vibration signal, and $$\upsilon = f/f_s,$$

in which formula
f=the frequency of the periodic vibration signal
$f_s$=sampling frequency.

4. A method according to claim 1, the wherein length of the measurement period (T) is at least 50 times the cycle length of the vibration signal.

5. A method according to claim 1, t wherein he sampling frequency ($f_s$) is at least three times the synchronous speed ($f_n$) of the motor (1).

6. A method according to claim 1 wherein, the speed of rotation is determined using a maximum likelihood estimate of the time domain.

7. A method according to claim 1, wherein the measuring sensor (3) is an acceleration sensor or a speed sensor.

8. A computer software product for determining speed of rotation of a motor, the product comprising a program code portion for collecting samples with a measuring sensor at a sampling frequency, set on the basis of mechanical vibration of the motor, for a duration of a measurement period;

a program code portion for storing the samples in a memory of a data carrier as measurement data of a fixed format;

a program code portion for determining the speed of rotation of the motor from the measurement data by determining the cycle length of a periodic vibration signal in the time domain by applying a maximum likelihood estimate calculated by maximizing a maximum likelihood function adjusted to the measurement data, the speed of rotation being obtained from a frequency point where the maximum likelihood function obtains its maximum value.

* * * * *